(12) United States Patent
Lopez Mendez et al.

(10) Patent No.: US 12,047,386 B2
(45) Date of Patent: Jul. 23, 2024

(54) AUGMENTED REALITY SYSTEM

(71) Applicant: Arm Limited, Cambridgeshire (GB)

(72) Inventors: Roberto Lopez Mendez, Cambridge (GB); Daren Croxford, Swaffham Prior (GB); Ioan-Cristian Szabo, Cambridge (GB); Mina Ivanova Dimova, Great Shelford (GB)

(73) Assignee: Arm Limited, Cambridge (GB)

( * ) Notice: Subject to any disclaimer, the term of this patent is extended or adjusted under 35 U.S.C. 154(b) by 422 days.

(21) Appl. No.: 17/001,187

(22) Filed: Aug. 24, 2020

(65) Prior Publication Data

US 2022/0060481 A1  Feb. 24, 2022

(51) Int. Cl.
*H04L 9/40* (2022.01)
*G06T 7/579* (2017.01)
*G06T 7/73* (2017.01)
*G06T 19/00* (2011.01)

(52) U.S. Cl.
CPC ............ *H04L 63/107* (2013.01); *G06T 7/579* (2017.01); *G06T 7/73* (2017.01); *G06T 19/006* (2013.01); *G06T 2207/10028* (2013.01)

(58) Field of Classification Search
CPC ......... H04L 63/107; G06T 7/579; G06T 7/73; G06T 19/006; G06T 2207/10028
See application file for complete search history.

(56) References Cited

U.S. PATENT DOCUMENTS

| | | | | |
|---|---|---|---|---|
| 11,366,903 | B1* | 6/2022 | Savant | G06F 21/54 |
| 2011/0164832 | A1* | 7/2011 | Yoon | G06T 7/73 |
| | | | | 382/294 |
| 2020/0280496 | A1* | 9/2020 | Oetting | H04L 41/509 |
| 2021/0019709 | A1* | 1/2021 | Ghatak | G06F 16/909 |
| 2021/0126823 | A1* | 4/2021 | Poess | H04W 4/029 |

* cited by examiner

*Primary Examiner* — Benjamin C Lee
*Assistant Examiner* — Nathan P Brittingham
(74) *Attorney, Agent, or Firm* — EIP US LLP

(57) ABSTRACT

A computer-implemented method for an augmented-reality system is provided. The computer-implemented method comprises obtaining sensed data, representing an environment in which the AR system is located, determining that the AR system is in a location associated with a first authority characteristic, and controlling access to the sensed data for one or more applications operating in the AR system. Each of the one or more applications is associated with a respective authority characteristic. Controlling access to the sensed data for a said application is performed in dependence on the first authority characteristic and a respective authority characteristic associated with the said application. An AR system comprising one or more sensors, storage for storing sensed data, one or more application modules, and one or more processors arranged to perform the computer-implemented method is provided. A non-transitory computer-readable storage medium comprising computer-readable instructions for performing the computer-implemented method is also provided.

16 Claims, 8 Drawing Sheets

AUGMENTED REALITY SYSTEM

BACKGROUND OF THE INVENTION

Field of the Invention

The present disclosure relates to augmented reality (AR) systems. The invention has particular, but not exclusive, relevance to the security of data generated by the AR system.

Description of the Related Technology

AR devices provide experiences to users in which a representation of a real-world environment is enhanced by computer-generated perceptual information. In order to accurately provide these experiences to users, the position and orientation of the AR device is determined so that the computer-generated perceptual information can be integrated into the representation of the real world. An alternative term for AR is "mixed-reality", which references the merging of real and virtual worlds.

Enhancing the real-world environment by computer-generated perceptual information may comprise the use of perceptual information that covers one or more sensory modalities including, for example, visual (in the form of images, which could be text or simple icons in some cases), auditory (in the form of audio), haptic (in the form of touch), somatosensory (relating to the nervous system), and olfactory (relating to the sense of smell) information.

Overlaying the sensory information on to the real-world (or "physical") environment can be done constructively (by adding to the natural environment) or destructively (by subtracting from, or masking, the natural environment). AR thus alters a user's perception of their real-world environment, while virtual reality (VR) replaces their real-world environment with an entirely simulated (i.e. computer-generated) one.

AR devices include, for example, AR enabled smart telephones, AR enabled mobile computers such as tablet computers, and AR headsets, including, for example, AR glasses. The position and orientation of an AR device, relative to an environment in which it is located, are generally determined based on sensed data generated by the AR device or associated with the AR device through a process of localization.

SUMMARY

In a first aspect of the present disclosure there is provided a computer-implemented method for an augmented reality, AR, system, the method comprising obtaining sensed data representing an environment in which an AR system is located, determining that the AR system is in a location associated with a first authority characteristic, and controlling access to the sensed data for one or more applications operating in the AR system, wherein each of the one or more applications is associated with a respective authority characteristic and controlling access to the sensed data for a said application is performed in dependence on the first authority characteristic and a respective authority characteristic associated with the said application.

In a second aspect of the present disclosure there is provided an augmented reality, AR, system comprising one or more sensors arranged to generate sensor data representing an environment in which the AR system is located; storage for storing sensed data; one or more application modules each application module being associated with a respective authority characteristic; and one or more processors arranged to: obtain sensed data representing an environment in which the AR system is located; determine the AR system is in a location associated with a first authority characteristic; and control access to the sensed data for the one or more application modules operating in the AR system, wherein controlling access to the sensed data for a said application module is performed in dependence on the first authority characteristic and a respective authority characteristic of the said application module.

In a third aspect of the present disclosure there is provided a non-transitory computer-readable storage medium comprising computer-executable instructions which, when executed by one or more processors, cause the one or more processors to: obtain sensed data representing an environment in which an AR system is located; determine that the AR system is in a location associated with a first authority characteristic; and control access to the sensed data for one or more applications operating in the AR system, wherein each of the one or more applications is associated with a respective authority characteristic, and controlling access to the sensed data for a said application is performed in dependence on the first authority characteristic and a respective authority characteristic associated with the said application.

DETAILED DESCRIPTION OF CERTAIN INVENTIVE EMBODIMENTS

Figure 1:
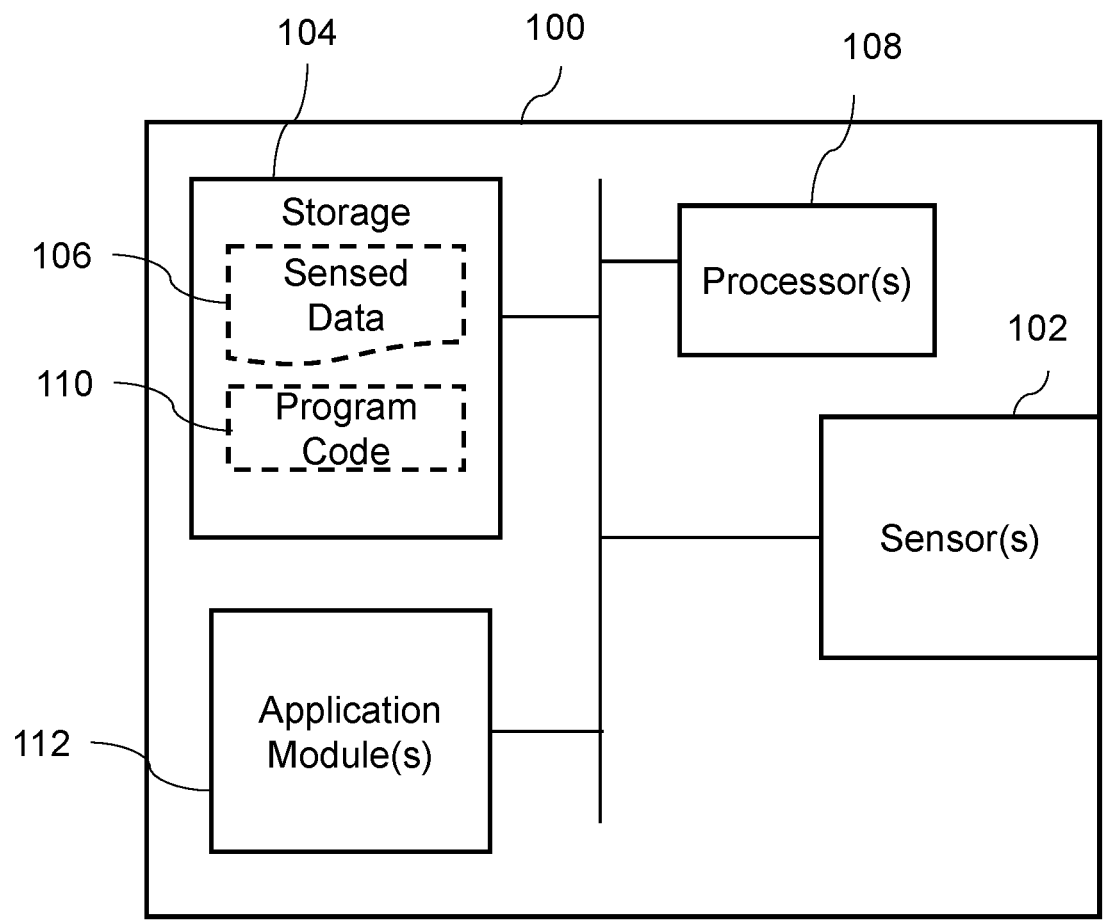
FIG. 1 is a schematic diagram of an augmented reality system according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily other examples. It should be further noted that certain examples are described schematically with certain features omitted and/or necessarily simplified for ease of explanation an understanding of the concepts underlying the examples.

Systems and methods relating to data processing and data management in the context of augmented reality (AR) systems are described herein. AR systems provide augmented reality experiences to users in which virtual objects, which may comprise perceptual information, are used to augment a representation, or a perception of, a real-world environment. A representation of the real-world environment may comprise sensor-originated data, which may also be referred to as sensed data, corresponding to one or more sensory modalities, e.g. visual (in the form of images data), auditory (in the form of audio data), touch (in the form of haptic data), nervous (in the form of somatosensory data), and smell (in the form of olfactory data).

The sensed data may be representative of a physical quantity measurable by a sensor. A sensor may be a device configured to measure a physical quantity, such as light, depth, motion, sound, etc. and convert it into a signal, e.g. an electrical signal. Examples of sensors include image sensors, tactile sensor, motion sensors, depth sensors, microphones, sound navigation and ranging (Sonar) devices, light detection and ranging (LiDAR) devices, radio azimuth detection and ranging (RADAR), global position system, GPS, sensors, and sensors included in inertial measurement units (IMUS) such as accelerometers, gyroscopes, and in some cases magnetometers. For example, an image sensor may convert light into a digital signal. Image sensors include image sensors which operate in the visible light spectrum, but may additionally, or alternatively, include image sensors which operate outside of the visible spectrum, for example the infrared spectrum. The sensed data associated with an image captured by a sensor may therefore comprise image data representative of an image captured by the sensor. However, in other examples the sensed data may additionally or alternatively comprise audio data representative of a sound (e.g. measurable by a microphone), or another kind of sensor-originated data representative of a difference physical quantity (e.g. haptic, somatosensory or olfactory data) measurable by a corresponding type of sensor. Sensed data may be source data, or "raw data", output directly from a sensor (e.g. sensor data) in some cases. In such cases, the sensed data may be obtained from a sensor, e.g. by direct transfer of the data or by reading the data from intermediate storage on which the data is stored. In other cases, the sensed data may be preprocessed: for example, further processing may be applied to the sensed data after it has been obtained by the sensor and before it is processed by a processor. In some examples, the sensed data comprises a processed version of the sensor data output by the sensor. For example, the raw sensory input may be processed to transform low-level information into higher-level information (e.g. extracting shapes from images for object recognition).

To provide AR experiences, the position and orientation of an AR system within a real-world environment is determined by a process of localization. The localization determines the position of the AR system with a high degree of precision, for example, with more precision than is provided by GPS location determination. Determining the position and orientation of the AR system using localization allows virtual objects to be integrated into a representation of the real-world accurately such that a user of the AR system experiences an immersive integration of the real-world and the virtual enhancements. The location and orientation of an AR system may be collectively referred to as a "geopose", or "geographically anchored pose", which represents the spatial location of the AR system and the orientation, or "pose", of the AR system specifying the pitch, roll, and yaw according to a coordinate system.

To determine the position and orientation of an AR system, localization data may be processed to determine the relative position of the AR system within the environment. Localization data may be derived from sensed data, which provides information representing the environment in which the AR system is located and/or information relating to the orientation and/or motion of the AR system. For example, portions of image data, generated from an image sensor included in an AR system, may be selected for inclusion in the localization data. Alternatively, or additionally, the image data may be processed to identify a set of feature points, for example, edges, corners, blobs, ridges and so forth, and build feature descriptors, which encode information relating to the feature points, enabling them to be differentiated. These feature points and descriptors are used to identify and track the position and orientation of the AR system based on the relative position of the objects and structures found within the environment. Localization data may be derived from a plurality of types of sensed data generated by different sensors. For example, image data or data representing a set of feature points and descriptors may be used in combination with motion data generated from an inertial measurement unit during localization (such as using.-Visual-Inertial Odometry), to accurately identify and track the location and orientation of a AR system as it moves through a real-world environment. Alternatively, or additionally, image data may be supplemented by depth information, generated by depth sensors or derived from LiDAR, RADAR, and other outputs, to identify the relative positions of objects in an image represented by the image data.

AR systems, such as AR enabled smart telephones generally comprise sensors such as image sensors, microphones, IMUS, and others described above, which are used to generated sensed data representing an environment in which the AR system is located. As AR systems become more prevalent, AR experiences are being provided in a wider range of locations and for a number of different purposes. For example, AR experiences may be provided in professional settings such as in offices, and factories, where they can be used to aide navigation within buildings, provide prompts and instructions for manufacturing workers and so forth. In some cases, the locations in which AR experiences are to be provided may be sensitive in nature and so it is a challenge to be able to provide AR experiences to users while maintaining privacy and security of the locations in which they are being provided.

Certain examples described herein relate to a computer-implemented method for an AR system in which sensed data is obtained, representing an environment in which the AR system is located, the AR system determines that it is in a location associated with a first authority characteristic and controls access to the sensed data for one or more applications running in the AR system based on the first authority characteristic and respective authority characteristics associated with each of the one or more applications. In some cases, controlling access to the sensed data for one or more of the applications may involve preventing the application from running in the AR system while the AR system is at the location which is associated with the first authority characteristic. In other examples, the application may be allowed to run but may be prevented from accessing some, or all, of the sensed data. In some cases, a combination of different types of control may be used simultaneously for one or more applications in the AR system.

FIG. 1 shows an example of an AR system 100 which may be embodied as a single device, such as an AR enabled smart telephone or an AR headset. Alternatively, the AR system 100 may be implemented by multiple devices which may be communicatively coupled via wired or wireless means. For example, an AR device such as a mobile computer or an AR enabled smart telephone which is in communication with one or more AR accessories such as an AR headset.

The AR system 100 includes one or more sensors 102 arranged to generate sensed data representing at least part of an environment in which the AR system 100 is located. The one or more sensors 102 include one or more cameras for generating image data representing part of the environment falling within a field of view of the one or more cameras. The field of view may be delimited in the vertical and/or horizontal directions, depending on the number and location of the cameras. For example, the cameras may be arranged to face in substantially the same direction as the head of a user, for example where the user is wearing an AR headset, in which case the field of view of the one or more cameras may include a whole or part of the user's field of vision. Alternatively, the field of view may include a wider region, for example completely surrounding the user. The cameras may include stereo cameras from which the AR system 100 can derive, using stereo matching, depth information indicating distances to objects in the environment. The sensor(s) 102 may alternatively, or additionally, include for example, depth sensors for generating depth information, an infrared camera, a sonar transceiver, a LiDAR system, a RADAR system, and so forth. Alternatively, or additionally, depth information may be generated using an image sensor, for example, by performing monocular depth estimation using a CNN (Convolutional Neural Network) or another suitable type of neural network on image data generated by the image sensor.

The sensors 102 may also include position sensors for determining a location and/or orientation (referred to collectively as a position or pose) of the user of the AR system 100. The position sensors may include a global positioning system (GPS) module, one or more accelerometers, one or more gyroscopes, and/or a Hall effect magnetometer for determining orientation (an electronic compass), for example, included in an IMU.

The AR system 100 includes storage 104 for storing sensed data 106 generated by the one or more sensors 102. The storage 104 may be embodied as any suitable combination of non-volatile and/or volatile storage. For example, the storage 104 may include one or more solid-state drives (SSDs), along with non-volatile random-access memory (NVRAM), and/or volatile random-access memory (RAM), for example, static random-access memory (SRAM) and dynamic random-access memory (DRAM) Other types of memory can be included, such as removable storage synchronous DRAM, and so on.

The AR system 100 comprises one or more processors 108. The processor(s) 108 may include various processing units including a central processing unit (CPU), a graphics processing unit (GPU) and/or a specialist neural processing unit (NPU) for efficiently performing neural network operations. The one or more processors 108 may include other specialist processing units, such as application specific integrated circuits (ASICs), digital signal processors (DSPs), or field programmable gate arrays (FPGAs).

The storage 104 holds machine-readable instructions in the form of program code 110 which, when executed by the one or more processors 108, cause the AR system 100 to perform methods as described hereinafter. The storage 104 is also arranged to store further data for use in performing said methods. The further data in this example includes the sensed data 106 generated by the one or more sensors 102.

The AR system 100 comprises one or more application modules 112. The one or more application modules comprise computer-readable instructions which when executed by one or more processors cause a respective application to run on the AR system 100. Applications include AR applications for providing an AR experience to a user of the AR system 100 as well as other applications for example, a camera application which enables a user to control an image sensor comprised in the AR system 100 to generate image data, a sound recording application enabling a user to control a microphone comprised in the AR system 100 to generate audio data, messaging applications which allow a user to use the AR system 100 to communicate with remote computing devices, and or data management applications which allow a user to manage data stored in the AR system 100 and in some cases store or synchronize said data with one or more remote computing devices. A number of other types of applications are also envisaged. In some examples, applications include applications which are designed to be operated by a user of the AR system 100, for example using one or more user interface devices included in the AR system 100. The applications may also include background applications which run on the AR system 100 without the direct control of, or by limited interaction with, a user of the AR system 100.

It will be appreciated, that the AR system 100 may comprise other components not shown in FIG. 1, for example a user interface used to provide an AR experience to a user of the AR system 100. A user interface may comprise any suitable combination of input and output devices. Input devices include, for example, touch screen interfaces for receiving input from a user, actuatable buttons for receiving an input from a user, sensors, such as motion sensors or microphones adapted to sense an input from a user. Alternatively, or additionally, controllers which are communicatively coupled to the AR system 100 by wired or wireless means may be used. For example, the controllers may comprise input devices such as tactile buttons, motion sensors for sensing gestures provided by a user, microphones for sensing voice commands provided by a user, and so forth. Output devices may include displays, such as touch screen displays, speakers, haptic feedback devices, and so forth.

Figure 2:
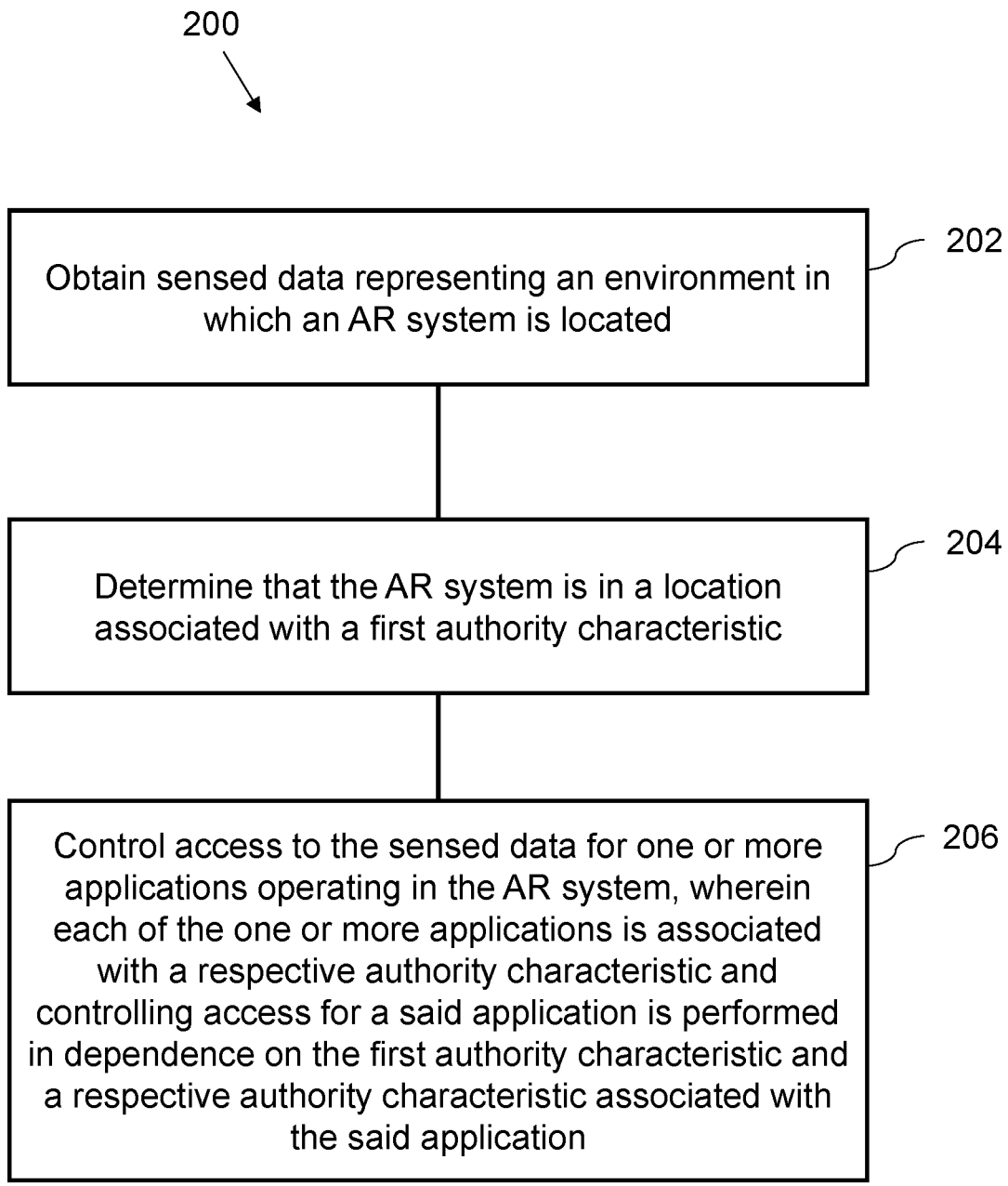
FIG. 2 is a flow diagram of a method implemented by an augmented reality system according to examples.

FIG. 2 shows an example of a method 200 performed by the AR system 100 in accordance with the present disclosure. It will be appreciated that while the method 200 is described in relation to the AR system 100, the same method 200 can be performed by any suitable AR system which is arranged to provide an AR experience to a user and which obtains sensed data to be used in providing the AR experience, for example, using one or more sensors included in the AR system. While the method 200 will be described below in a specific order, it will be appreciated that certain steps may be performed in a different order than described.

The AR system 100 obtains, at a first block 202, sensed data representing an environment in which the AR system is located. Obtaining sensed data may include generating sensed data using the one or more sensors 102 included in the AR system 100. In some examples, the AR system 100 may be continuously, regularly, or periodically generating sensed data 106 without an input from the user. For example, the AR system 100 may continuously be generating audio data representing sounds in an environment in which the AR system 100 is located using a microphone included in the AR system 100. The audio data may be stored in a buffer and processed to identify voice commands provided by a user of the AR system 100. In some cases, location data generated by a GPS sensor may be continuously or periodically generated to track the position of the AR system 100.

In some examples, the AR system 100 may use the one or more sensors to generate sensed data 106 under certain predetermined conditions, for example, where an application which uses sensed data 106 is operating in the AR system, such as a camera application, a sound recording application, or an augmented reality application, and so on. AR systems 100 may generate sensed data 106 under more than one of these conditions, so for example, the AR system 100 may be continuously generating audio data, periodically generating location data, and generating image data when certain applications are running on the AR system 100.

In other examples, obtaining sensed data 106 may alternatively, or additionally, include receiving sensed data from one or more remote computing devices, and or reading sensed data from storage 104 in the AR system 100.

The AR system 100 determines, at a second block 204, that the AR system is in a location associated with a first authority characteristic. Users of AR systems 100 may move through a number of locations while operating, or in possession of, the AR system 100. For example, where the AR system 100 is a mobile computing device, or an AR enabled smart telephone, the AR system 100 may be in a bag or pocket of a user who is freely moving through a real-world environment. Alternatively, or additionally, a user of the AR system 100 may be actively using the AR system 100 while moving through a real-world environment. In some examples, an AR system 100 may be used for navigation, wherein an image of the real-world presented to a user may be enhanced by the inclusion of arrows or signs showing the user in which direction they should travel through the environment in order to reach a predetermined destination. Other AR experiences which are provided to users may also rely on, or encourage, a user to move through a real-world environment.

In some cases, the different locations, (or "environments") may be associated with different authority (or "security") characteristics. An authority characteristic may be used to determine, or in some cases may define, functions, or types of functions, which AR systems 100 are allowed to perform at that location. For example, where a user of the AR system 100 is located in a public space, such as on a public street, an authority characteristic of that public space may be associated with a low amount of security. In other words, it may be unlikely that any information, including sensed data 106 which is generated by sensors 102 in the AR system 100, representing the public space is sensitive in nature. As such, there may be no restriction on the function of the AR system 100 while it is in that location.

In other examples, a private facility, such as a factory or office, may be associated with an authority characteristic which represents a high amount of security. In other words, sensed data 106 generated by an AR system 100 in that location may be sensitive in nature as it represents private or confidential information. As such, the authority characteristic associated with such a location may specify what functions, or types of functions, an AR system 100 is allowed to perform within that location. In some examples, a location may either be associated with an authority characteristic which relates to a highly sensitive location, or an authority characteristic which relates to an environment which isn't sensitive. In other examples, an authority characteristic associated with a specific location may be associated with any one of a plurality of different degrees of sensitivity, for example, where there are more than two different authority characteristics, each representing a different degree of security or sensitivity of the location. In such a case, the types of functions and/or applications which may be allowed to operate on the AR system 100 while it is in any of these locations may be defined by any of a plurality of different configurations. What is considered private and/or sensitive information may differ depending on the environment. For example, in some cases the layout and or structure of the environment itself may be sensitive in nature. Alternatively, or additionally, objects positioned within the environment may be sensitive in nature, for example, where they relate to confidential information.

Determining that the AR system 100 is in a location associated with a first authority characteristic may be implemented internally in the device and/or may be determined based on external signaling provided to the AR system 100. In a first example, the AR system 100 may store location data representing different locations and associating these locations with respective authority characteristics. As the AR system 100 moves, a signal such as a GPS signal or a cellular communication signal, indicating the location of the AR system 100 may be compared to the location data to determine whether the AR system 100 is in a location associated with a first authority characteristic. Alternatively, or additionally, a computing device associated with the location may provide a signal to the AR system 100 to notify the AR system that it is in a location associated with the first authority characteristic. Different methods and systems for determining that the AR system 100 is in a location associated with the first authority characteristic will be described further below with respect to FIGS. 6 and 7.

The AR system 100, controls, at a third block 206, access to the sensed data 106 for one or more applications operating in the AR system 100, wherein each of the one or more applications is associated with a respective authority characteristic. Controlling access to the sensed data 106 for the applications is performed in dependence on the first authority characteristic and respective authority characteristics associated with the applications. For example, where the first authority characteristic is associated with a high security location, only applications which have a specific authority characteristic may be allowed to operate on the AR system 100 while the AR system 100 is at that location. In this way, it is possible to prevent any less-secure applications from accessing sensed data 106 representing the high security location. For example, third party applications which are not approved and/or which are arranged to transmit sensed data 106 to third parties, may be prevented from accessing to the sensed data 106.

In an example, the applications may be associated with their respective authority characteristics during production. For example, after being created, a given application may be tested and/or analyzed to determine an appropriate authority characteristic. Said authority characteristic may be dependent on the types and number of functions which are performed by the application, and/or on the types of data which are processed by said application. For example, applications which are designed to transmit sensed data 106 to one or more remote computing devices may be provided an authority characteristic which would limit or entirely prevent their function in certain locations, such as high security locations.

In some cases, the act of associating applications with a given authority characteristic may include, as a default, associating applications with an authority characteristic which prevents their function in specific environments such as locations associated with the first authority characteristic. The authority characteristic associated with a given application may then be adjusted if it is determined that it is suitable for operation within specific environments such locations associated with the first authority characteristic. For example, an owner of a high security location may analyze and/or approve certain applications for operating in the high security location. In some cases, an owner of a secure facility may create a custom application for use in the secure facility, wherein the custom application is associated with a respective authority characteristic which allows said application to be operated while the AR system 100 is in the secure facility. For example, a navigation application, or a work-based AR application may be developed by an owner of a secure facility for use within that facility.

In examples where the AR system 100 includes multiple devices, for example, a compute module implemented as a mobile computing device, and one or more further devices, such as an AR headset or glasses, the multiple devices may be arranged to communicate using suitable encryption technology. For example, sensed data 106 generated by one or more sensors 106 of an AR headset may be encrypted before being transferred by wired or wireless means to a compute module in order to prevent third parties from accessing sensitive information represented by the sensed data 106.

Figure 3:
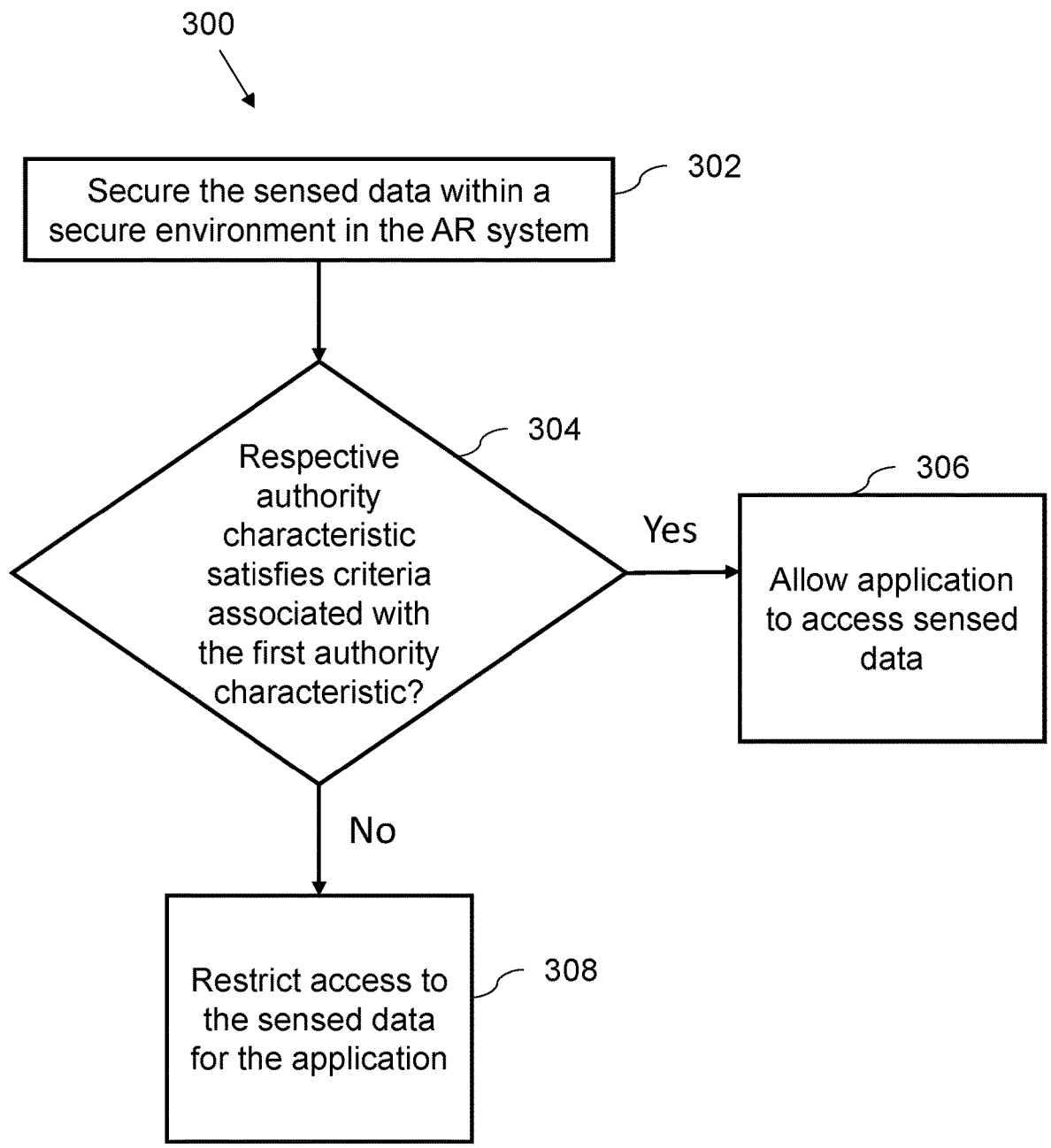
FIG. 3 is a flow diagram of a method of controlling accesses to sensed data according to examples.

FIG. 3 shows a flow diagram 300 of a process for controlling access to the sensed data 106 for an application. At a first block 302, the AR system 100 secures the sensed data 106 in a secure environment within the AR system 100. For example, the secure environment may be implemented using the TrustZone® technology developed by Arm Limited of Cambridge, UK for example, which provides mechanisms for enforcing security boundaries in a data processing apparatus such as an AR system 100.

At a second block 304, The AR system 100 determines if a respective authority characteristic associated with a given application satisfies criteria associated with the first authority characteristic. If the respective authority characteristic associated with the given application satisfies the criteria associated with the first authority characteristic then, at block 306, the application is allowed to access the sensed data 106. If the respective authority characteristic associated with the given application does not satisfy criteria associated with the first authority characteristic then, at block 308, access to the sensed data 106 is restricted for the given application.

In some examples, criteria associated with the first authority characteristic may relate to a list of approved applications. If the application is an approved application, then it will be allowed to access the secured sensed data 106. In other examples, the criteria associated with the first authority characteristic may specify more granular detail regarding what types of applications are to be allowed access to the sensed data 106. For example, the criteria associated with the first authority characteristic may represent meta-data identifying certain types of applications which are to be allowed access to the sensed data 106. In this way, the AR system 100 may be able to determine whether new applications which have not yet been approved or denied access to the sensed data 106 should be approved or denied. Alternatively, or additionally, the criteria may identify specific functions which should not be performed by certain applications if they are to access the sensed data 106 while the AR system 100 is in the location associated with the first authority characteristic.

Restricting access to the sensed data 106 for an application may comprise preventing the application from running on the AR system 100 while the AR system 100 is in the location associated with the first authority characteristic. Alternatively, or additionally, restricting access may comprise allowing said application to run on the AR system 100 and preventing said application from accessing the sensed data 106. For example, while the application is running, any components in the AR system 100 which are being used to run the application may be prevented from accessing or interfacing with certain other components in the AR system which are associated with the secure environment in the AR system.

Figure 4:
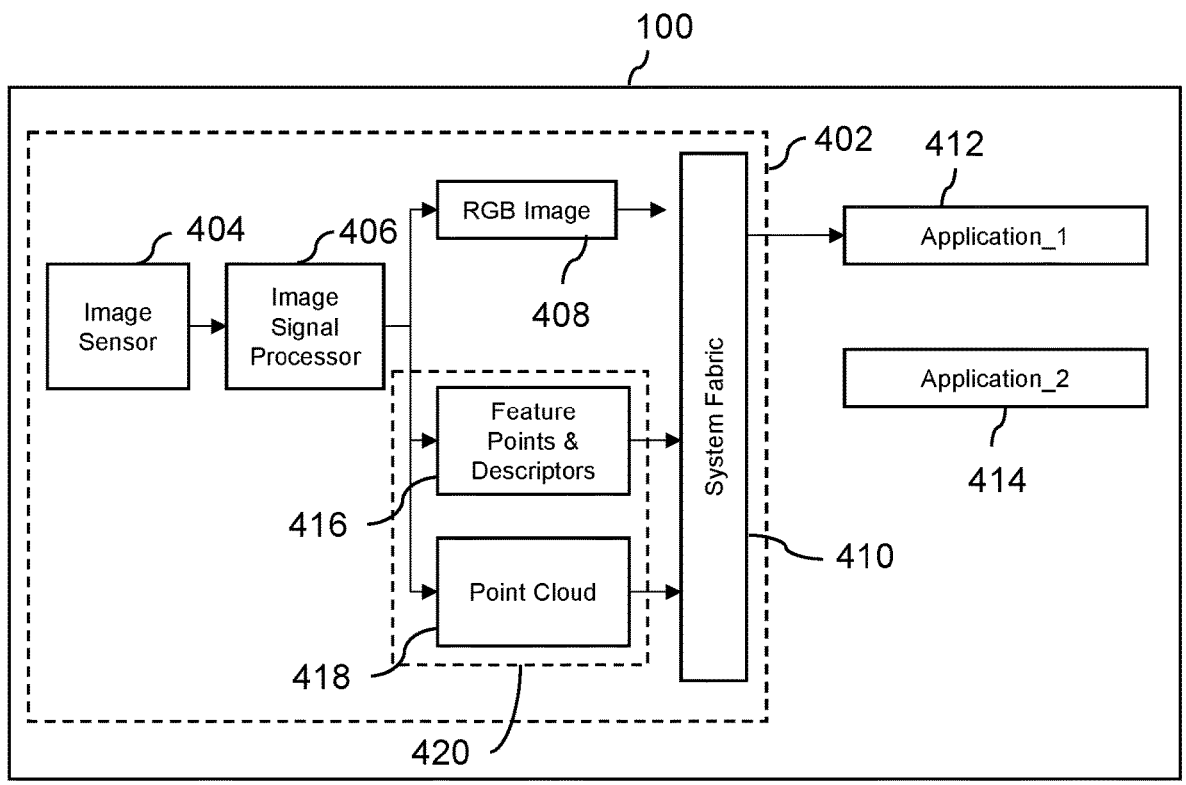
FIG. 4 is a schematic diagram showing a method implemented by an augmented reality system according to examples.

FIG. 4 shows a schematic example of the AR system 100 in which a secure environment 402 has been formed around certain components in the AR system 100, for example, using the TrustZone® technology described above. In some examples, at least part of the storage 104 may be included in the secure environment 402 while other parts of the storage may be outside of the secure environment 402. An image sensor 404 and an image signal processor 406 are both included inside the secure environment 402 in the AR system 100. In this way, image data, for example, raw image data, generated by the image sensor 404 is protected within the secure environment 402 and applications which are not approved for operating while the AR system 100 is in the location associated with the first authority characteristic cannot access the raw image data. As described above, the raw image data may be processed by the image signal processor 406 to generate image data representing an RGB image 408 which may also be stored within the secure environment 402. In the example shown, there are two applications 412 and 414. A first application 412 is associated with an authority characteristic which satisfies criteria associated with the first authority characteristic, while the second application 414 is associated with an authority characteristic which does not satisfy the criteria associated with the first authority characteristic. The system fabric 410 ensures that the sensed data 106, for example, the RGB image data 408, cannot be accessed by any applications 414 which are not authorized within the location associated with the first authority characteristic. In some examples, the system fabric 410 may also manage, for example curating and filtering, the access to the sensed data 408 for approved applications 412.

As described above, localization data 420 which is to be used to determine the position and orientation of the AR system 100 in order to provide AR experiences may be derived from sensed data 106. In some examples, the AR system 100 may derive the localization data 420 using at least some of the sensed data 106. In the example shown in FIG. 4 the localization data 420 is derived from image data, for example by processing the image data, but the localization 420 may additionally, or alternatively, include at least part of the sensed data. In the shown example, the image signal processor 406 is used to process image data generated by the image sensor 404 to identify a set of feature points. One or more processors 108 in the AR system 100 may then build feature descriptors which encode information relating to the feature points to generate data representing the feature points and descriptors 416. The feature points and descriptors can be to identify and track the positions of objects and structures in the environment such that the relative position and orientation of the AR system can be determined. Alternatively, or additionally, the AR system 100 may generate data representing a point cloud 418, wherein a point cloud includes a set of one or more three-dimensional points representing the environment in which the AR system 100 is located. Localization data 420 may be derived from a plurality of types of sensed data 106 generated by different sensors. For example, image data, or data representing a group of one or more feature points and descriptors 416, may be used in conjunction with motion data generated from an inertial measurement unit during localization, to accurately identify and track the location and orientation of the AR system 100 as it moves through a real-world environment. Alternatively, or additionally, image data may be supplemented by depth information, generated by depth sensors for example, from LiDAR, RADAR, time of flight sensors, structured light systems, stereo image sensors for stereo depth matching, and other sensor outputs, to identify the relative positions of objects in an image represented by the image data.

As described above, localization data 420 may comprise sensed data 106, as well as other types of data derived from sensed data 106. While localization data 420 may not include sensed data 106 in some examples, other types of data such as data representing feature points and descriptors 416 may be used to determine and/or identify information about the real-world environment in which the AR system 100 is located. For example, feature inversion may be used to reconstruct an original image from data representing feature points and descriptors 416. The AR system 100 may also control access to the localization data 420 for the one or more applications operating in the AR system, wherein controlling access to the localization data 420 for a said application is performed in dependence on the first authority characteristic and a respective authority characteristic associated with the said application. In this way, any data which may be used to determine sensitive information about the location associated with the first authority characteristic may be secured within the secure environment 402.

As with the sensed data 106, controlling access to the localization data 420 for a said application may comprise securing the localization data 420 within a secure environment 402 in the AR system 100. The AR system 100 may then allow the said application to access the localization data 420 if the respective authority characteristic satisfies criteria associated with the first authority characteristic, or to restrict access if the respective authority characteristic does not satisfy these criteria.

In some examples, the AR system 100 may be arranged to transmit localization data 420 to one or more remote computing devices to perform localization. For example, localization data may be transmitted to one or more remote computing devices implementing, or comprising, an AR cloud. The AR cloud may comprise, or implement, a real-time spatial (i.e. "three-dimensional" or "3D"), map of the real world, for example, in the form of a point cloud. One such AR function which may be performed by an AR cloud is localization. In this case, AR systems arranged to provide AR experiences to users provide localization data to the AR cloud and the AR cloud determines the location and orientation of the AR system based on the localization data 420 and the real-time spatial map of the real world. In other examples, an AR cloud may comprise, or implement, a real-time spatial map of specific parts of a real-world environment. Positional data (or "geopose data"), representing the location and orientation of the AR system with respect to the environment may then be provided to the AR system by the AR cloud.

Where an AR cloud is used to perform localization of the AR system 100, any data, for example localization data 420, which is transmitted to the AR cloud may be provided in a secure manner. For example, localization data 420 may be encrypted while in the AR system 100 and before being transmitted to the AR cloud. In this way, even if the localization data 420 is intercepted while being transmitted to the AR cloud, third parties may be prevented or inhibited from accessing sensitive information represented by the localization data 420. In cases, where localization data 420 is to be transmitted to an AR cloud for localization while the AR system 100 is in a secure location, there may be provided a local and secure AR cloud with which localization can be performed. For example, an owner or managing agent of a secure location may provide a secure server implementing a local AR cloud, for example, including a three-dimensional representation of the secure location, and suitable for communicating with AR systems 100 in the secure location to perform localization.

Figure 5:
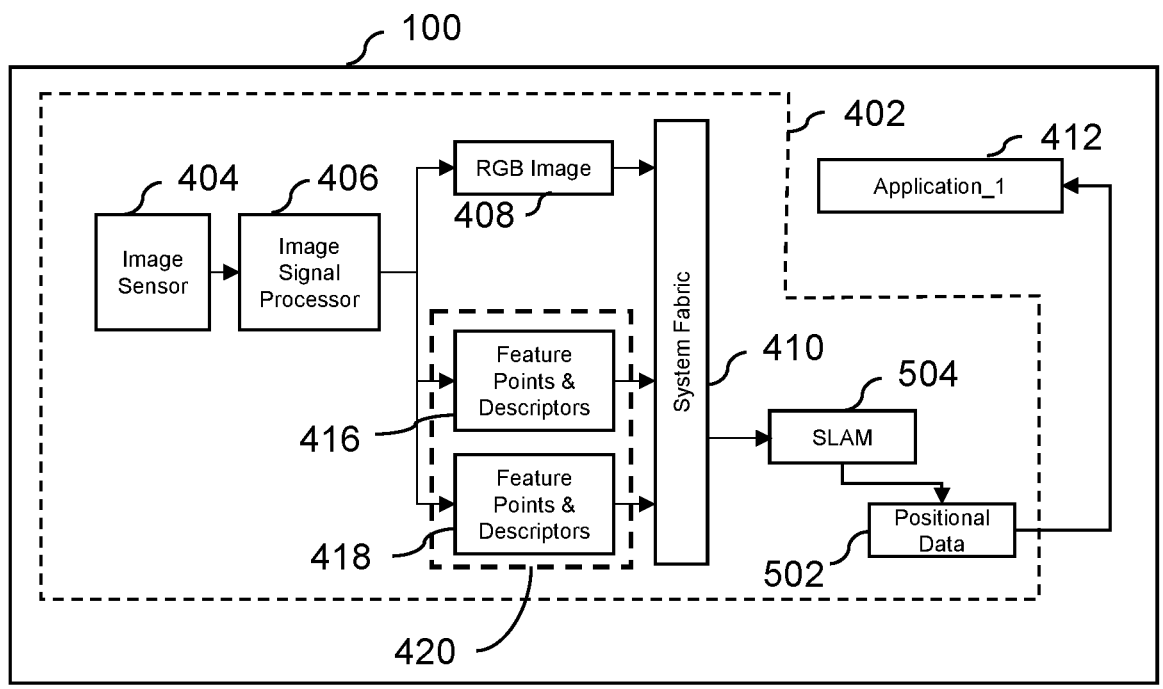
FIG. 5 is a schematic diagram showing a method implemented by an augmented reality system according to examples.

In other examples, the AR system 100 may be arranged to perform localization to determine the position and orientation of the AR system 100 locally. FIG. 5 shows an example of the AR system 100 in which the AR system 100 controls access to the localization data 420 by determining the position and orientation of the AR system 100 within the secure environment 402, thereby preventing any applications from accessing the localization data 420. In the example, shown in FIG. 5, the localization data 420, in this example including the data representing feature points and descriptors 416 and the data representing the point cloud 418 are secured within the secure environment 402. The localization data 420 is then processed within the secure environment 402 to obtain positional data 502 representing a position and orientation of the AR system 100. A number of different types of localization processes may be used to determine to the orientation and position of the AR system 100. In the present example, the position and orientation of the AR system is determined using simultaneous localization and mapping (or "SLAM") 504 to determine positional data 502. The positional data 502 may then be provided to one or more applications 412, or access to the positional data may be restricted in dependence on the authority characteristics associated with the one or more applications. Similar to the examples relating to the sensed data 106 and localization data 420 described above, depending on whether the authority characteristics satisfy criteria associated with the first authority characteristic, the respective applications may be allowed or restricted access to the positional data 502. In some examples, the AR system 100 may control access to the sensed data 106, localization data 420, and the positional data 502, wherein some applications may be allowed access to some of these types of data and not others. For example, a respective authority characteristic associated with an application may not satisfy criteria associated with the first authority characteristic to be allowed access to sensed data or localization data 420, but may satisfy enough criteria to be allowed access to the positional data 502.

In other examples, a part of the SLAM 504 pipeline may be included within the secure environment 402, while other parts of the SLAM 504 pipeline may not be included in the secure environment. So, for example, an initial part of the SLAM 504 processing which utilizes and/or operates on the localization data 420 may be secured within the secure environment 402, while other parts of the SLAM 504 pipeline which do not directly use localization data 420 may be outside of the secure environment 402 as there is a smaller risk that these processes can be used to determine sensitive information about the location associated the first authority characteristic.

Figure 6:
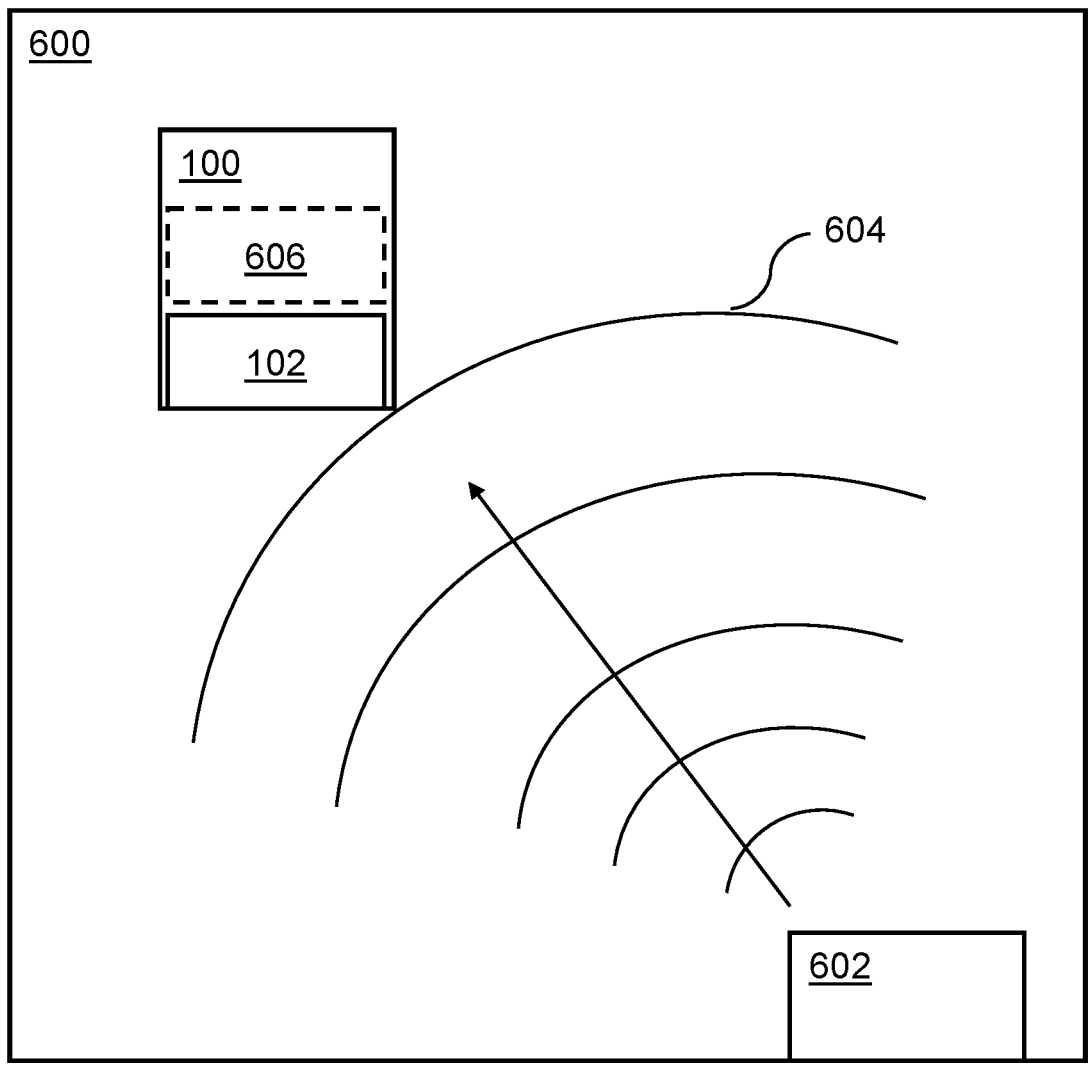
FIG. 6 is a schematic diagram showing an augmented reality system in a location associated with a first authority characteristic according to examples.

FIG. 6 shows an example in which an AR system 100 determines that it is in a location 600 associated with a first authority characteristic by receiving a signal from a transmitter 602 associated with the location 600. In the example shown, the transmitter 602 notifies the AR system 100 by sending a signal 604 to the AR system 100. The transmitter 602 may be included as part of a computing device located within or near the location 600. In some examples, the signal 604 may comprise sound waves, for example, an ultrasonic tone which is not audible to humans may be transmitted by the transmitter 602. The AR system 100 is arranged to generate sensed data 106, such as audio data, using one or more sensors 102, such as microphones, and process the audio data to identify an audio communication indicating the AR system is in the location 600. Using sound waves to notify the AR system 100 that it is entering or in a location 600 may allow the AR system 100 to be notified without unintentionally notifying other AR systems which are not in the location 600. Sound waves may be detectable within smaller ranges than radio waves, for example due to larger dissipation rates in air, and hence can prevent the unintentional notification of other AR systems 100. This property may be reinforced by using highly directional soundwaves and/or by insulating, or sound proofing, the location 600.

In other examples, the signals 604 comprise modulated light signals. For example, visible light communication may be used in which characteristics, such as amplitude and/or frequency, of a light source may be modulated to carry a signal to the AR system 100. This modulation may be performed at such a frequency so as to be imperceptible to humans who are located within range of the light source. The AR system may then use the one or more sensors 102, such as image sensors, to generate image data which can be processed to identify signals which indicate that the AR system 100 is in or is entering the location 600 associated with the first authority characteristic. In this way, the AR system 100 may readily determine that it is located in the location 600. Where an AR system 100 is providing an AR experience to a user, it may already be continually capturing and processing image data from one or more image sensors and so upon entry into the location 600, the AR system 100 may be notified that it has entered a location associated with a first authority characteristic straight away. Modulated light signals may operate using a number of different types of light including visible, infrared, and ultraviolet light. Where the transmitter 602 is located within the location 600, using modulated light signals may prevent any AR systems outside of the location 600 from being unintentionally notified/signalled, in particular where the location 600 is a confined space such as a specific room or more generally inside a secure facility.

In the example shown in FIG. 6 the transmitter 602 is in the location 600, however, in some examples, the transmitter 602 may be located outside of the location 600, for example, at an entrance to the location 600 such that AR systems 100 entering the location 600 are provided a signal 604 from which they may determine that they are entering a location 600 associated with a first authority characteristic.

In other examples, the signals 604 are radio waves such as, for example, WiFi®, Bluetooth®, or other suitable radio wave frequency communication types. Where the signals 604 are radio wave signals, the AR system 100 may comprise one or more communication modules 606 for receiving and transmitting such signals from the transmitter 602. The communication module(s) 606 may be arranged to transmit and receive signals over any suitable wireless communication type. For example, the communication module(s) 606 may use any of Wi-Fi®, Bluetooth®, infrared, cellular frequency radio waves, or any other suitable wireless communication type. Alternatively, or additionally, the communication module(s) 108 may be arranged to transmit data over a wired connection.

Figure 7:
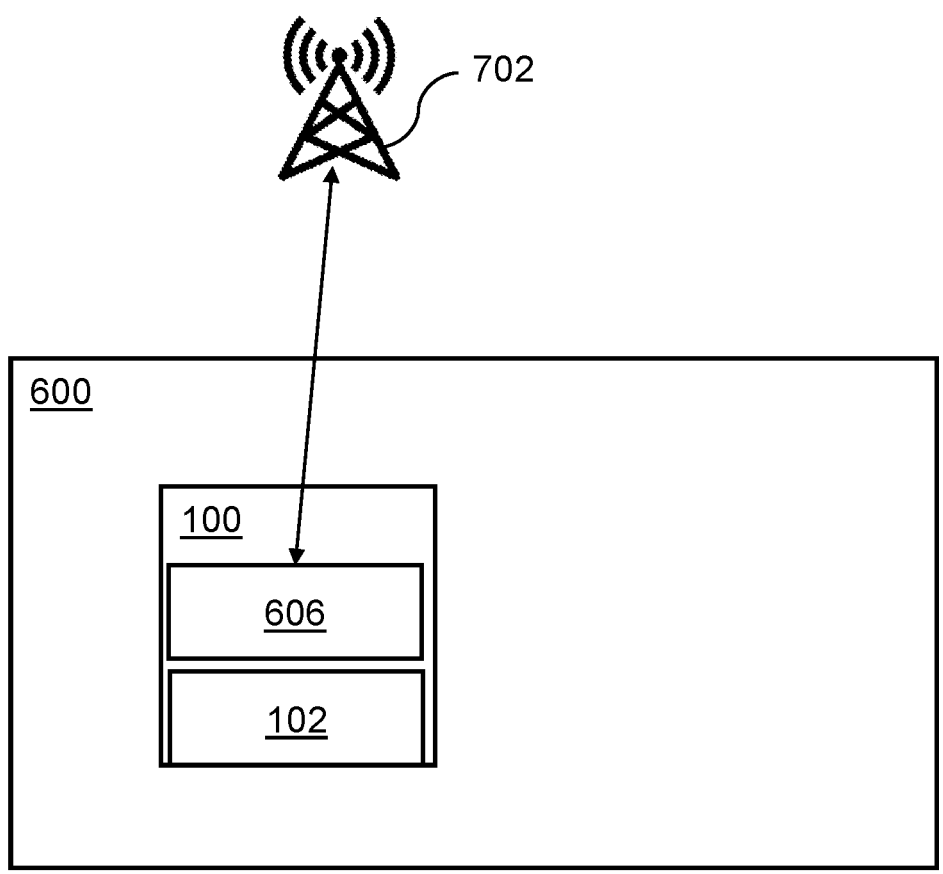
FIG. 7 is a schematic diagram showing an augmented reality system in a location associated with a first authority characteristic and communicating with a cellular network according to examples.

FIG. 7 shows an example in which an AR system 100 is in a location 600 associated with the first authority characteristic. In the example shown in FIG. 7, the AR system 100 comprises one or more communication modules 606. The one or more communication modules 606 are arranged to communicate with a cellular network 702 wherein determining that the AR system 100 is in the location 600 comprises receiving a signal from a cellular network 702. For example, high precision carrier phase tracking may allow precise determinations of the location of the AR system 100 to be determined. Fifth generation (5G) cellular networks may allow such carrier phase tracking to operate at centimeter-level positional accuracy allowing the AR system 100 to readily identify that it is in the location 600. In some examples, the signal from the cellular network 702 indicates that the AR system 100 is in the location while in other examples, the AR system 100 may be notified of its location by the cellular network 702 and may determine based on stored location data indicating locations associated with the first authority characteristic, whether it has entered the location 600.

In some examples, when leaving a location 600 associated with the first authority characteristic, the AR system 100 may also remove or relax the secure environment 402. For example, the AR system 100 may determine that it is outside of the location 600 associated with the first authority characteristic using the same methods by which it determined that it was located in the location 600, in other words, by receiving signals from a cellular network 702, a transmitter 602, and/or by determining in the AR system 100 itself. The AR system 100 may obtain further sensed data representing an environment in which the AR system is now located, wherein the further sensed data represents an environment outside of the location 600 associated with the first authority characteristic. The further sensed data may then be provided to the one or more applications 412 and 414, for example, without the AR system 100 controlling access to the further sensed data. The sensed data 106 which was generated while the device was in the location 600 may be maintained in the secure environment 402 to prevent subsequent disclosure and/or transmission of said sensed data 106 to less-secure applications 414, wherein less-secure applications include those applications which are not suitable for operation in the secure location, for example, non-approved applications.

Figure 8:
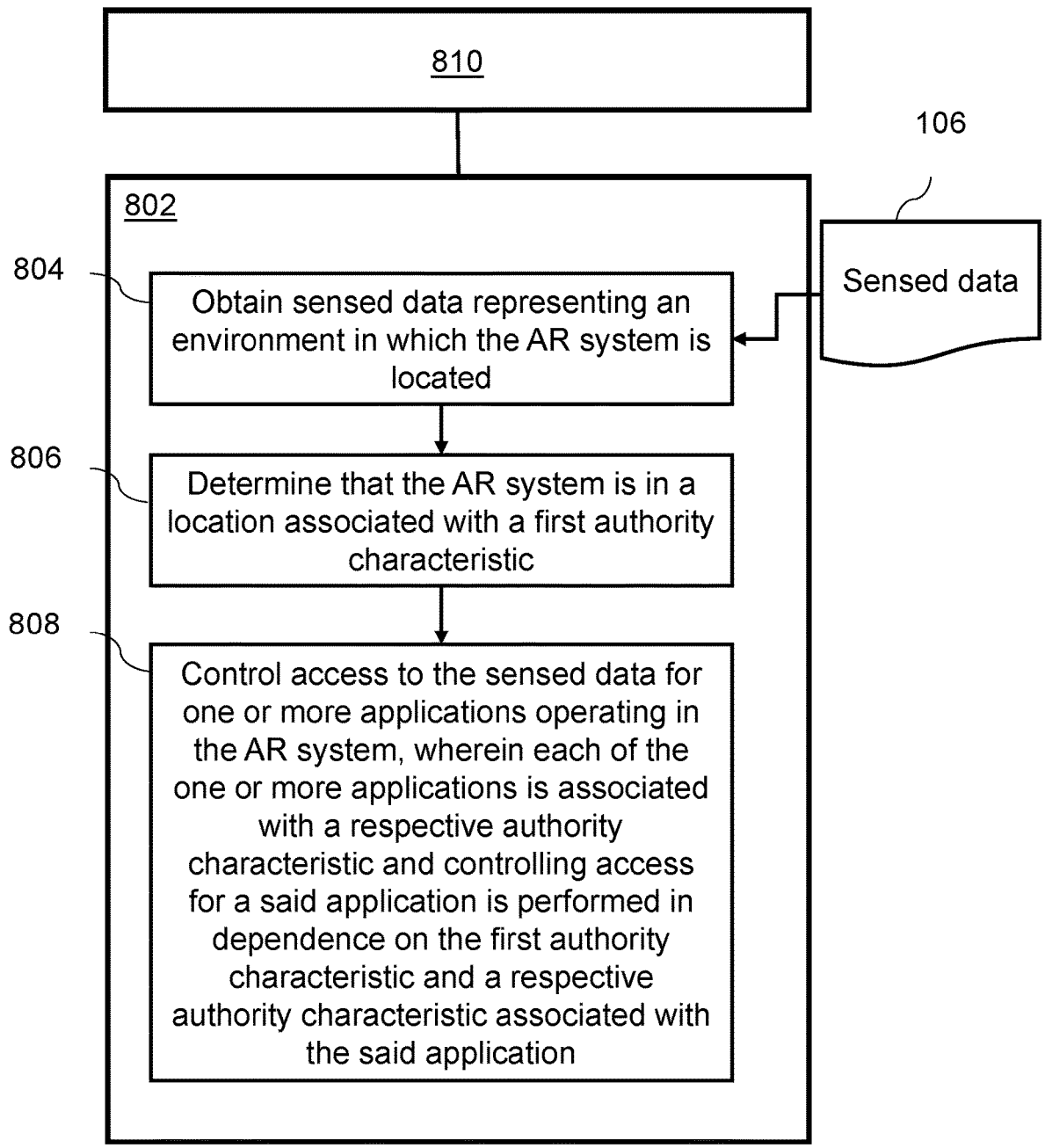
FIG. 8 is a schematic diagram of a non-transitory computer-readable storage medium comprising computer-readable instructions according to examples.

FIG. 8 shows a non-transitory computer-readable storage medium 802 comprising computer-readable instructions 804 to 808 which, when executed by one or more processors 810, cause the one or more processors 810 to execute methods as described above, and shown in blocks 804 to 808. The examples and variations of the method 200 described above in relation to FIGS. 1 to 7 also apply to the computer-readable instructions 804 to 808 included on the computer-readable storage medium 802.

It is to be understood that any features described in relation to any one example may be used alone, or in combination with other features described, any may also be used in combination with one or more features of any other examples, or any combination of any other examples. Furthermore, equivalents and modification not described above may also be employed without departing from the scope of the accompanying claims.

What is claimed is:

1. A computer-implemented method for an augmented reality, AR, system, the method comprising:
   obtaining sensed data including image data representing a physical environment in which an AR system is located;

securing the sensed data in storage included within a secure environment in the AR system;

determining that the AR system is in a location associated with a first authority characteristic;

controlling access to the sensed data for one or more applications operating in the AR system;

deriving localization data, including a set of feature points or a point cloud representing a structure of the physical environment, for use in determining a position and orientation of the AR system by processing at least some of the sensed data including the image data within the secure environment in the AR system to identify the set of feature points or the point cloud;

securing the localization data in storage included within the secure environment in the AR system; and controlling access to the localization data for the one or more applications operating in the AR system, wherein each of the one or more applications is associated with a respective authority characteristic and controlling access to the sensed data and the localization data stored in the secure environment in the AR system for a said application is performed in dependence on the first authority characteristic and a respective authority characteristic associated with the said application.

2. The computer-implemented method of claim 1, wherein controlling access to the sensed data for the said application comprises:

if the respective authority characteristic associated with the said application satisfies criteria associated with the first authority characteristic, allowing the said application to access the sensed data; and if the respective authority characteristic associated with the said application does not satisfy criteria associated with the first authority characteristic, restricting access to the sensed data for the said application.

3. The computer-implemented method of claim 1, wherein controlling access to the localization data for the said application comprises:

if the respective authority characteristic associated with the said application satisfies criteria associated with the first authority characteristic, allowing the said application to access the localization data; and if the respective authority characteristic associated with the said application does not satisfy criteria associated with the first authority characteristic, restricting access to the localization data for the said application.

4. The computer-implemented method of claim 1, wherein controlling access to the localization data for a said application comprises:

processing the localization data within the secure environment to obtain positional data representing a position and orientation of the AR system;

if the respective authority characteristic associated with the said application satisfies criteria associated with the first authority characteristic, allowing the said application to access the positional data; and if the respective authority characteristic associated with the said application does not satisfy criteria associated with the first authority characteristic, restricting access to the positional data for the said application.

5. The computer-implemented method of claim 4, wherein processing the localization data to obtain positional data includes using simultaneous localization and mapping, SLAM.

6. The computer-implemented method of claim 1, wherein determining that the AR system is in the location associated with the first authority characteristic comprises receiving a signal from a cellular network in communication with the AR system.

7. The computer-implemented method of claim 1, wherein determining that the AR system is in the location associated with the first authority characteristic comprises receiving a signal from a transmitter associated with the location, wherein the transmitter is arranged to transmit a signal using any of:
radio waves;
sound waves; and
modulated light.

8. The computer-implemented method of claim 1, comprising:

determining that the AR system is outside of the location associated with the first authority characteristic;

obtaining further sensed data representing an environment in which the AR system is located, wherein the further sensed data represents an environment outside of the location associated with the first authority characteristic; and providing the further sensed data to the one or more applications.

9. An augmented reality, AR, system comprising:

one or more sensors arranged to generate sensed data representing an environment in which the AR system is located;

storage included within a secure environment in the AR system for storing sensed data;

one or more application modules each application module being associated with a respective authority characteristic; and one or more processors arranged to:
obtain sensed data including image data representing a physical environment in which the AR system is located;

secure the sensed data in the storage included within the secure environment in the AR system;

determine that the AR system is in a location associated with a first authority characteristic;

control access to the sensed data for the one or more application modules operating in the AR system;

derive localization data, including a set of feature points or a point cloud representing a structure of the physical environment, for use in determining a position and orientation of the AR system by processing at least some of the sensed data including the image data within the secure environment in the AR system to identify the set of feature points or the point cloud;

securing the localization data in the storage included within the secure environment in the AR system; and control access to the localization data for the one or more application modules operating in the AR system, wherein controlling access to the sensed data and the localization data stored in the secure environment in the AR system for a said application module is performed in dependence on the first authority characteristic and a respective authority characteristic of the said application module.

10. The AR system of claim 9, wherein the one or more sensors comprise any of:
an image sensor;
a depth sensor;
a microphone;
a light detection and ranging, LiDAR system;
a radio azimuth direction and ranging, RADAR system;

an inertial measurement unit comprising any of:
  an accelerometer;
  a gyroscope; and
  a magnetometer.

11. The AR system of claim 9, wherein determining that the AR system is in the location associated with the first authority characteristic comprises processing at least a portion of the sensed data to identify any of:
  an audio communication indicating that the AR system is in the location associated with the first authority characteristic; and
  a modulated light signal indicating that the AR system is in the location associated with the first authority characteristic.

12. The AR system of claim 9, wherein the AR system comprises one or more communication modules, and wherein determining that the AR system is in the location associated with the first authority characteristic comprises receiving an indication that the AR system is in a location associated with the first authority characteristic using the one or more communication modules.

13. The AR system of claim 9, wherein controlling access to the sensed data for the said application module comprises:
  if the respective authority characteristic associated with the said application module satisfies criteria associated with the first authority characteristic, allowing the said application module to access the sensed data; and
  if the respective authority characteristic associated with the said application module does not match the first authority characteristic, restricting access to the sensed data for the said application module.

14. The AR system of claim 9, wherein controlling access to the localization data for the said application module comprises:
  if the respective authority characteristic associated with the said application module satisfies criteria associated with the first authority characteristic, allowing the said application module to access the localization data; and
  if the respective authority characteristic associated with the said application does not satisfy criteria associated with the first authority characteristic, restricting access to the localization data for the said application.

15. The AR system of claim 9, wherein controlling access to the localization data for a said application module comprises:
  processing the localization data within the secure environment to obtain positional data representing a position and orientation of the AR system;
  if the respective authority characteristic associated with the said application module satisfies criteria associated with the first authority characteristic, allowing the said application module to access the positional data; and
  if the respective authority characteristic associated with the said application module does not satisfy criteria associated with the first authority characteristic, restricting access to the positional data for the said application module.

16. A non-transitory computer-readable storage medium comprising computer-executable instructions which, when executed by one or more processors, cause the one or more processors to:
  obtain sensed data including image data representing a physical environment in which an AR system is located;
  secure the sensed data in storage included within a secure environment in the AR system;
  determine that the AR system is in a location associated with a first authority characteristic;
  control access to the sensed data for one or more applications operating in the AR system;
  derive localization data, including a set of feature points or a point cloud representing a structure of the physical environment, for use in determining a position and orientation of the AR system by processing at least some of the sensed data including the image data within the secure environment in the AR system to identify the set of feature points or the point cloud;
  secure the localization data in storage included within the secure environment in the AR system; and
  control access to the localization data for the one or more application modules operating in the AR system,
  wherein each of the one or more applications is associated with a respective authority characteristic, and controlling access to the sensed data and the localization data stored in the secure environment in the AR system for a said application is performed in dependence on the first authority characteristic and a respective authority characteristic associated with the said application.

* * * * *